(12) United States Patent
Liu et al.

(10) Patent No.: US 8,760,018 B2
(45) Date of Patent: Jun. 24, 2014

(54) MOTOR STATOR WITH HEAT DISSIPATION STRUCTURE

(75) Inventors: Wen-Hao Liu, New Taipei (TW); Chu-Hsien Chou, New Taipei (TW)

(73) Assignee: Asia Vital Components Co., Ltd., New Taipei (TW)

( * ) Notice: Subject to any disclaimer, the term of this patent is extended or adjusted under 35 U.S.C. 154(b) by 49 days.

(21) Appl. No.: 13/355,082

(22) Filed: Jan. 20, 2012

(65) Prior Publication Data

US 2013/0187484 A1 Jul. 25, 2013

(51) Int. Cl.
*H02K 1/04* (2006.01)

(52) U.S. Cl.
USPC .................................. 310/64; 310/52; 310/43

(58) Field of Classification Search
USPC .......................................... 310/43, 44, 52–64
See application file for complete search history.

(56) References Cited

U.S. PATENT DOCUMENTS

| | | | | |
|---|---|---|---|---|
| 3,801,843 A | * | 4/1974 | Corman et al. | 310/52 |
| 4,337,405 A | * | 6/1982 | Hishida | 310/43 |
| 6,838,790 B2 | * | 1/2005 | Arimitsu et al. | 310/43 |
| 7,498,762 B2 | * | 3/2009 | Takada | 318/778 |
| 7,569,955 B2 | * | 8/2009 | Hassett et al. | 310/54 |
| 8,283,818 B2 | * | 10/2012 | Hassett et al. | 310/60 R |
| 2008/0018181 A1 | * | 1/2008 | Neal | 310/54 |

* cited by examiner

*Primary Examiner* — Dang Le

(57) ABSTRACT

A motor stator with heat dissipation structure for fan includes a silicon steel plate assembly having a plurality of magnetic-pole columns, on each of which at least one winding is wound, and a space is defined between any two adjacent magnetic-pole columns; a covering being a heat-conducting plastic material filled in the spaces while covering the silicon steel plate assembly and the windings; and a plurality of heat pipes being extended into or through the covering filled in the spaces, so that heat produced by the silicon steel plate assembly and the windings during operation thereof can be transferred to the covering, and the heat pipes can absorb the heat from the covering and dissipate the absorbed heat into ambient air. Therefore, the silicon steel plate assembly and the windings can have lowered temperature and the cooling fan can have upgraded heat dissipation characteristic.

9 Claims, 9 Drawing Sheets

MOTOR STATOR WITH HEAT DISSIPATION STRUCTURE

FIELD OF THE INVENTION

The present invention relates to a motor stator with heat dissipation structure, and more particularly to a motor stator with heat dissipation structure for lowering the temperature of a silicon steel plate assembly and a plurality of windings thereof to ensure a cooling fan's operating performance.

BACKGROUND OF THE INVENTION

With the quick development in the electronic industry in recent years, many electronic devices have highly upgraded performance and more internal chip sets with constantly increased computing and data processing speed. However, the increased internal chip sets also produce more heat during operation thereof. The produced heat must be timely removed, lest it should adversely affect the electronic devices' performance and computing speed. The electronic devices might become burned out if the produced heat is undesirably accumulated therein. Therefore, it has become an important issue as how to effectively dissipate heat from the electronic devices.

A cooling fan has become one of the prerequisite parts in many heat dissipating systems because it is able to quickly carry away the heat absorbed by and then radiated into ambient air by radiating fins and to ensure good air circulation surrounding an electronic device.

In FIGS. 1A and 1B, there is shown a conventional motor stator structure 10 for use with a cooling fan. The motor stator structure 10 includes a plurality of silicon steel plates 11, each of which has a central hole 111 and a plurality of magnetic poles 112 symmetrically and radially outward extended from the central hole 111. When the silicon steel plates 11 are stacked, the magnetic poles thereof are also correspondingly stacked to form a plurality of magnetic-pole columns 113. A plurality of windings 12 are wound on the magnetic-pole columns 113. A space 121 is formed between any two adjacent magnetic-pole columns 113. A covering 13 is filled into the spaces 121 and encloses the silicon steel plates 11, the magnetic-pole columns 113, and the windings 12 therein by way of injection molding. When the motor stator structure 10 operates, the silicon steel plates 11 and the windings 12 will generate a magnetic field. In the process of generating the magnetic field, the temperature of the silicon steel plates 11 and the windings 12 increases to produce heat in the motor stator structure 10. Since the conventional motor stator structure 10 does not include any heat dissipation device around the silicon steel plates 11 and the windings 12, the produced heat will accumulate in the motor stator structure 10 and could not be effectively transferred to an outer side of the covering 13 for dissipating into ambient air. The accumulated heat will adversely affect the operating performance of the cooling fan, preventing the cooling fan from effectively extend its heat dissipation characteristic.

In brief, the conventional motor stator has the following disadvantages: (1) unable to effectively remove the heat produced by the windings and the silicon steel plates from the stator; (2) adversely affecting the cooling fan's operating performance; and (3) unable to effectively extend the fan's heat dissipation characteristic.

SUMMARY OF THE INVENTION

A primary object of the present invention is to provide a motor stator with heat dissipation structure capable of lowering the temperature of a silicon steel plate assembly and a plurality of windings thereof.

Another object of the present invention is to provide a motor stator with heat dissipation structure capable of upgrading a cooling fan's heat dissipation characteristic.

To achieve the above and other objects, the motor stator with heat dissipation structure according to the present invention is applicable to a cooling fan and mainly includes a silicon steel plate assembly, a covering, and a plurality of heat pipes. The silicon steel plate assembly includes a plurality of stacked silicon steel plates, each of the silicon steel plates includes a plurality of radially outward extended magnetic poles, and the magnetic poles of the stacked silicon steel plates together defines a plurality of magnetic-pole columns with a space formed between any two adjacent magnetic-pole columns; and each of the magnetic-pole columns has at least one winding wound thereon. The covering is filled into the spaces between the adjacent magnetic-pole columns and covered over the silicon steel plate assembly and the windings. The heat pipes are arranged in the spaces and extended into or through the covering filled in the spaces. Since the covering is a heat-conducting plastic material, heat produced by the silicon steel plate assembly and the windings can be transferred via the covering, and the heat pipes can absorb the heat from the covering and dissipate the absorbed heat into ambient air. With these arrangements, the silicon steel plate assembly and the windings can have lowered temperature and the cooling fan with the motor stator can have upgraded heat dissipation characteristic.

Thus, the present invention provides the following advantages: (1) lowering the temperature of the silicon steel plate assembly and of the windings; (2) upgrading the cooling fan's operating performance; and (3) effectively expanding the cooling fan's heat dissipation characteristic.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1A:
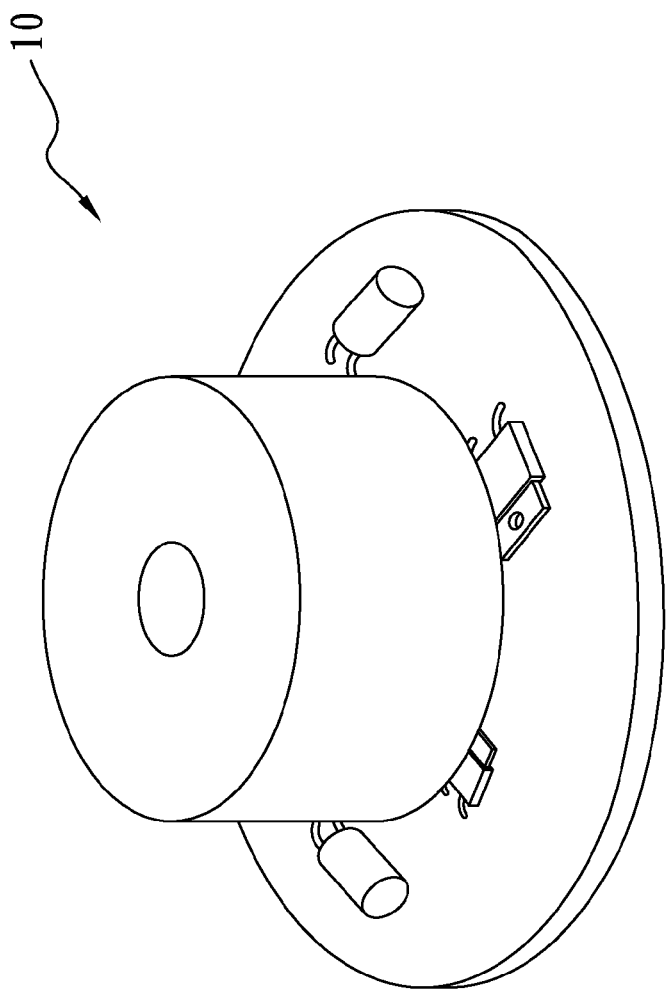
FIG. 1A is a perspective view of a conventional motor stator structure.
Figure 1B:
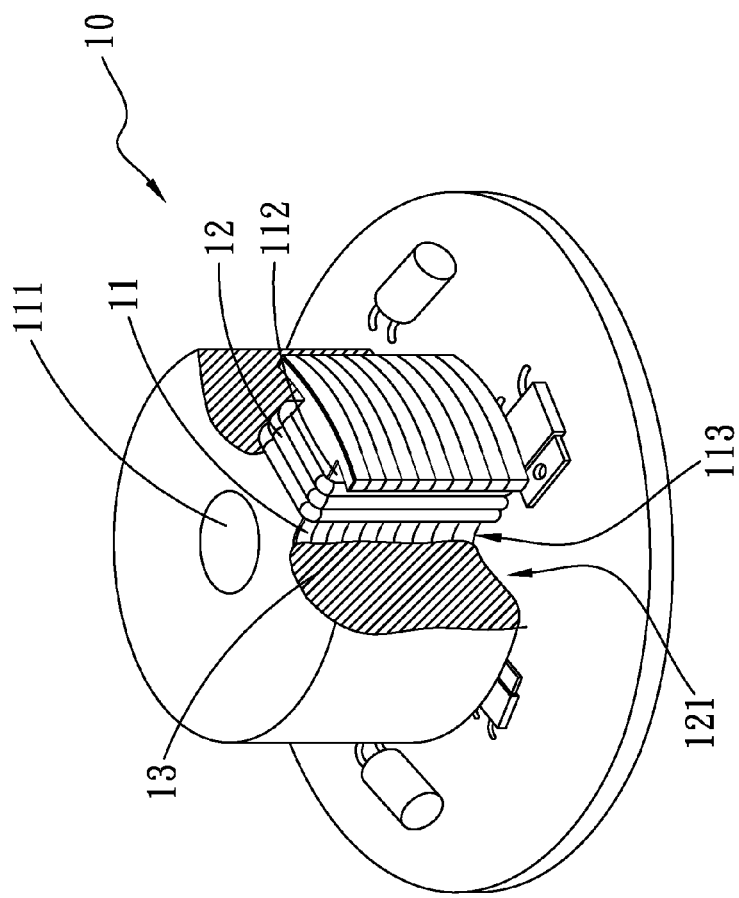
FIG. 1B is a cutaway view of the conventional motor stator structure of FIG. 1A.

The present invention will now be described with some preferred embodiments thereof and with reference to the accompanying drawings. For the purpose of easy to understand, elements that are the same in the preferred embodiments are denoted by the same reference numerals.

Figure 2A:
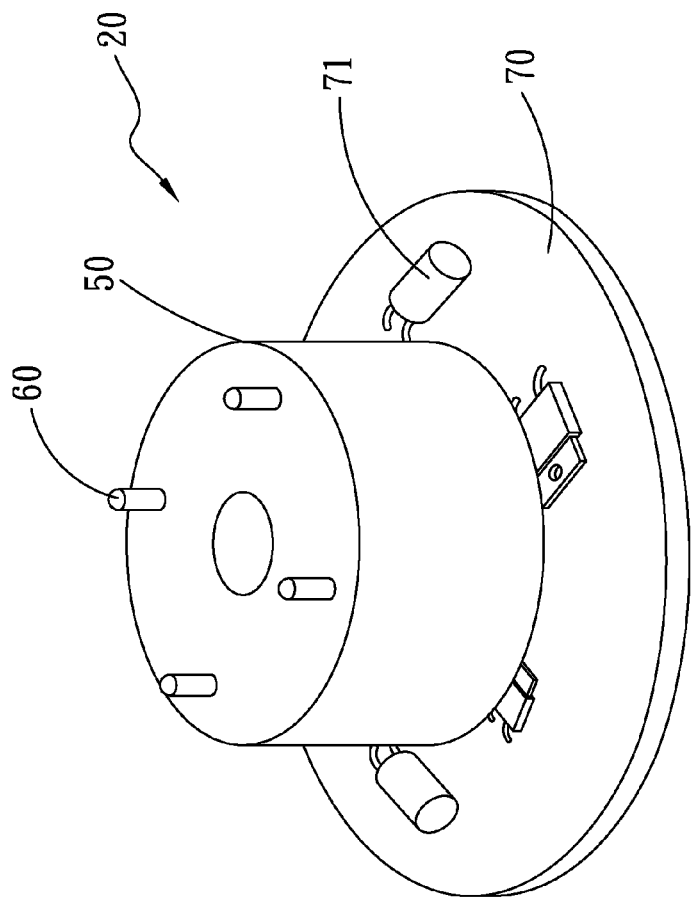
FIG. 2A is a perspective view of a motor stator with heat dissipation structure according to a first embodiment of the present invention.
Figure 2B:
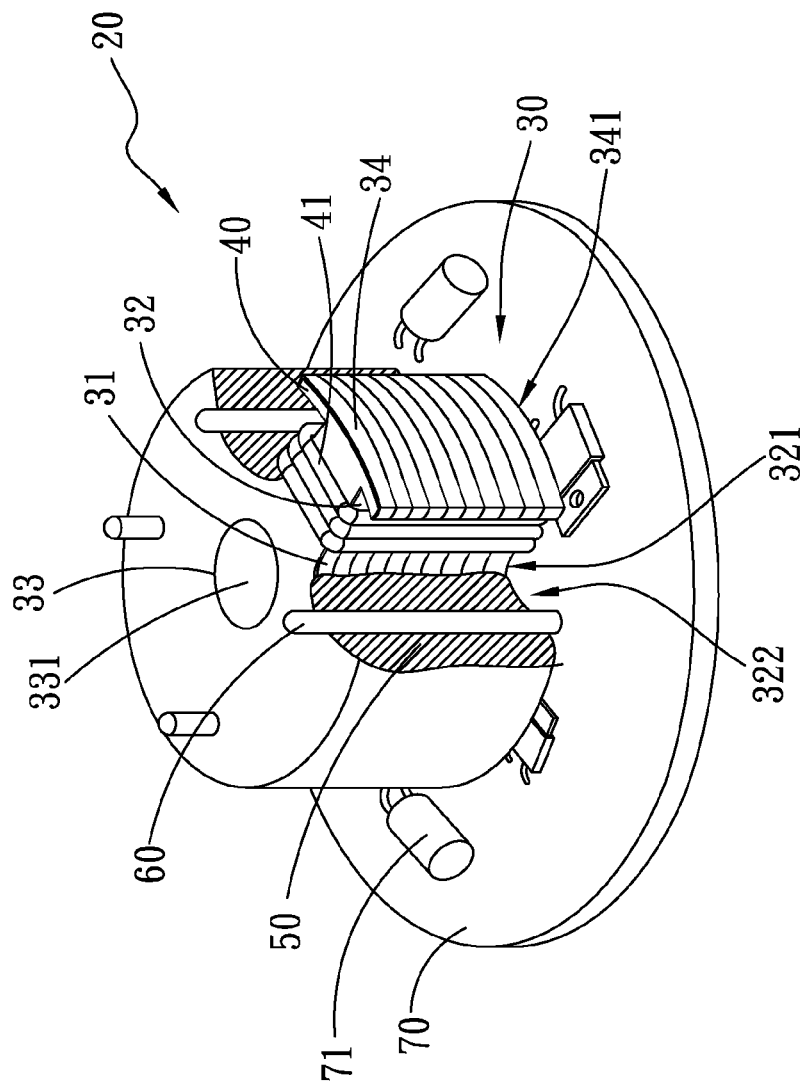
FIG. 2B is a cutaway view of the motor stator with heat dissipation structure according to the first embodiment of the present invention.
Figure 2C:
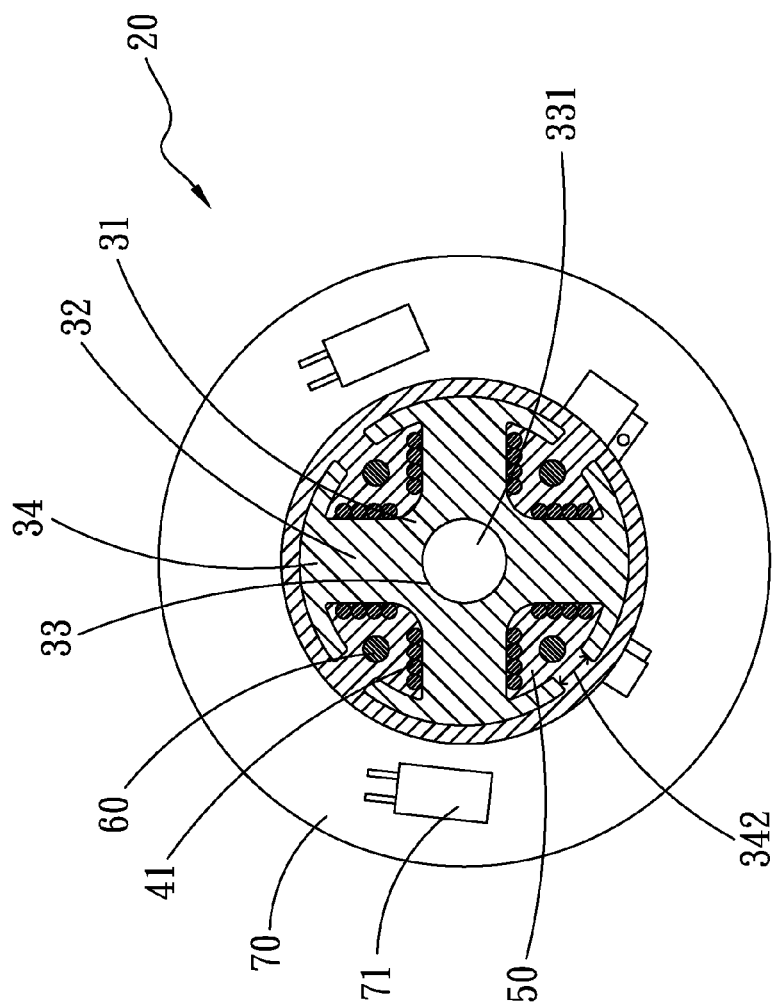
FIG. 2C is a partially sectioned top view of the motor stator with heat dissipation structure according to the first embodiment of the present invention.

Please refer to FIGS. 2A, 2B and 2C, in which a motor stator with heat dissipation structure according to a first embodiment of the present invention is shown. The motor stator is applicable to a cooling fan, and is generally denoted by reference number 20 herein. As shown, the motor stator 20 includes a silicon steel plate assembly 30, a covering 50, a plurality of heat pipes 60, and a fan circuit board 70.

The silicon steel plate assembly 30 includes a plurality of stacked silicon steel plate 31. Two axially opposite sides of the silicon steel plate assembly 30 are provided with an insulating section 40, over which windings 41 are wound. The silicon steel plates 31 are correspondingly formed with a plurality of symmetrically arranged magnetic poles 32, such that the magnetic poles 32 of the stacked silicon steel plates 31 form a plurality of magnetic-pole columns 321 and a space 322 is defined between any two adjacent magnetic-pole columns 321. Further, the silicon steel plates 31 respectively have a central hole 33, and the magnetic poles 32 are radially outward extended from the central hole 33. Each of the magnetic poles 32 has a radially outer end formed with a circumferentially length-extended section 34. The holes of the stacked silicon steel plates 31 together define am axial channel 331. And, the length-extended sections 34 on each of the magnetic-pole columns 321 together define a magnetic-pole end portion 341, such that a narrowed opening 342 is formed between any two adjacent magnetic-pole end portions 341. The space 322 defined between any two adjacent magnetic-pole columns 321 is communicable with the opening 342 formed between the magnetic-pole end portions 341 of the two adjacent magnetic-pole columns 321. The spaces 322 are filled with the covering 50 while the covering 50 also covers the silicon steel plate assembly 30 and the windings 41. The heat pipes 60 are arranged in the spaces 322 and extended into the covering 50 filled in the spaces 322. The fan circuit board 70 is connected to one of the two axially opposite ends of the silicon steel plate assembly 30 and is electrically connected to the windings 41. At least one electronic element 71 is provided on the fan circuit board 70.

The covering 50 is a heat-conducting plastic material being covered over the silicon steel plate assembly 30, the windings 41 and the heat pipes 60 and filled in the spaces 322 by way of integral injection molding. In the illustrated first embodiment, the heat pipes 60 are arranged in the spaces 322 and extended into the covering 50. When the electronic elements 71 on the fan circuit board 70 are electrically connected, the windings 41 and the silicon steel plate assembly 30 are driven by the electronic elements 71 to generate a magnetic field. In the process of generating the magnetic field, the temperature of the windings 41 and the silicon steel plate assembly 30 increases to produce heat in the stator 20. With the heat-conducting covering 50, the produced heat can be transferred to and absorbed by the heat pipes 60 in the covering 50. The heat pipes 60 in turn transfer and dissipate the absorbed heat into ambient air to lower the temperature of the windings 41 and of the silicon steel plate assembly 30, so as to upgrade the cooling fan's heat dissipation characteristic.

Figure 3A:
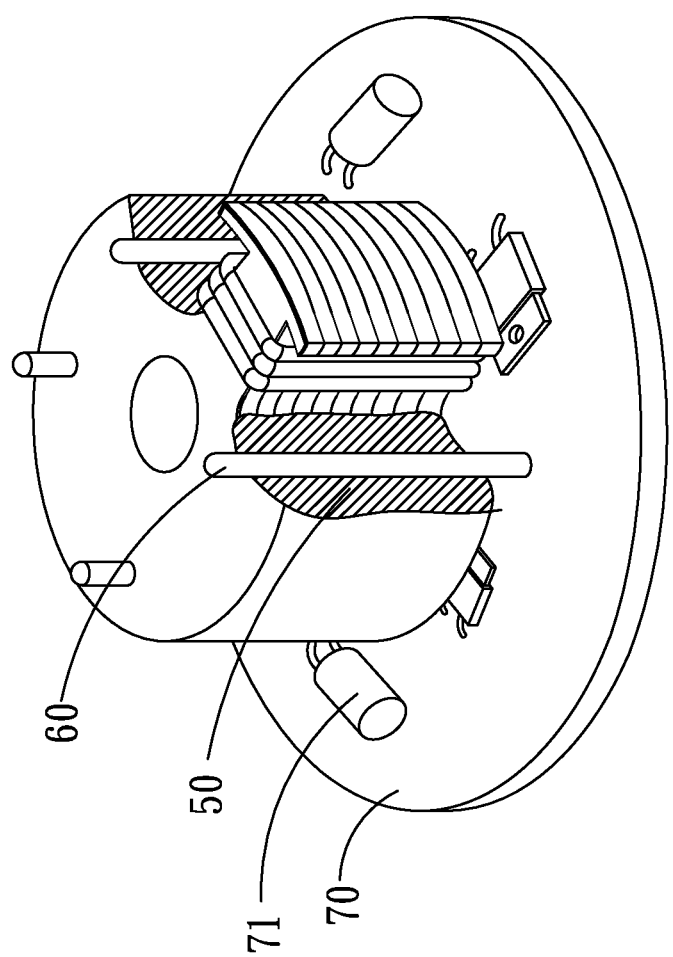
FIG. 3A is a cutaway view of a motor stator with heat dissipation structure according to a second embodiment of the present invention.
Figure 3B:
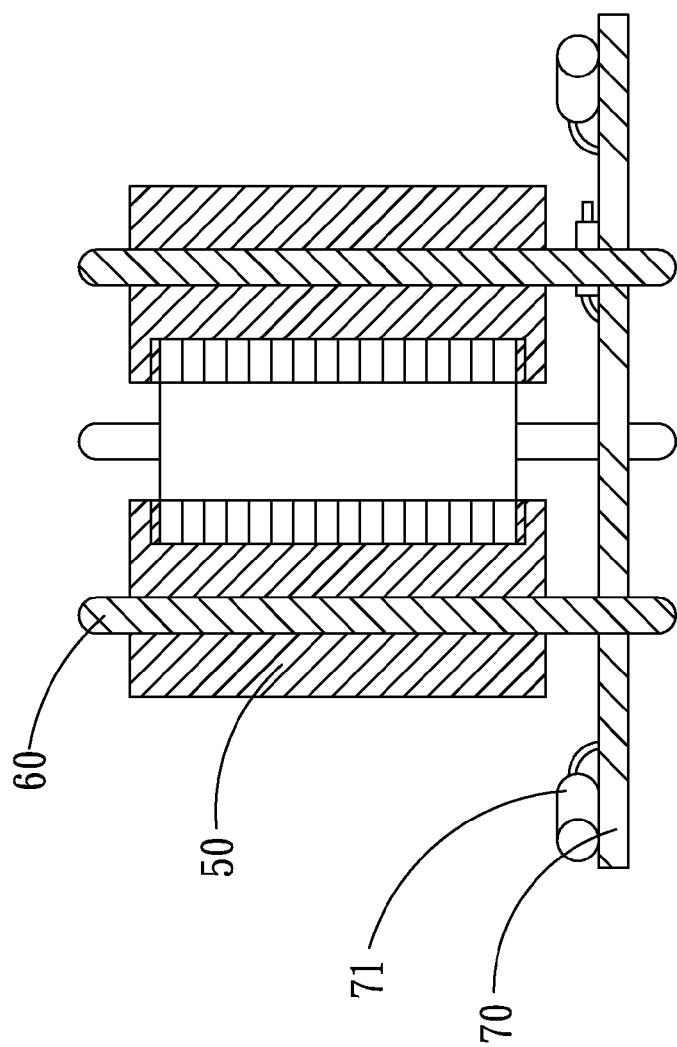
FIG. 3B is a vertical sectional view of the motor stator with heat dissipation structure according to the second embodiment of the present invention.

Please refer to FIGS. 3A and 3B, in which a stator with heat dissipation structure according to a second embodiment of the present invention is shown. The stator of the present invention in the second embodiment is generally structurally similar to the first embodiment, except that the heat pipes 60 are extended through the covering 50 to connect to the fan circuit board 70. With the above arrangement, heat produced by the electronic element 71 on the fan circuit board 70 during operation thereof can also be transferred to and absorbed by the heat pipes 60 for dissipating into ambient air and lowering the temperature of the fan circuit board 70 and of the electronic element 71.

Figure 4A:
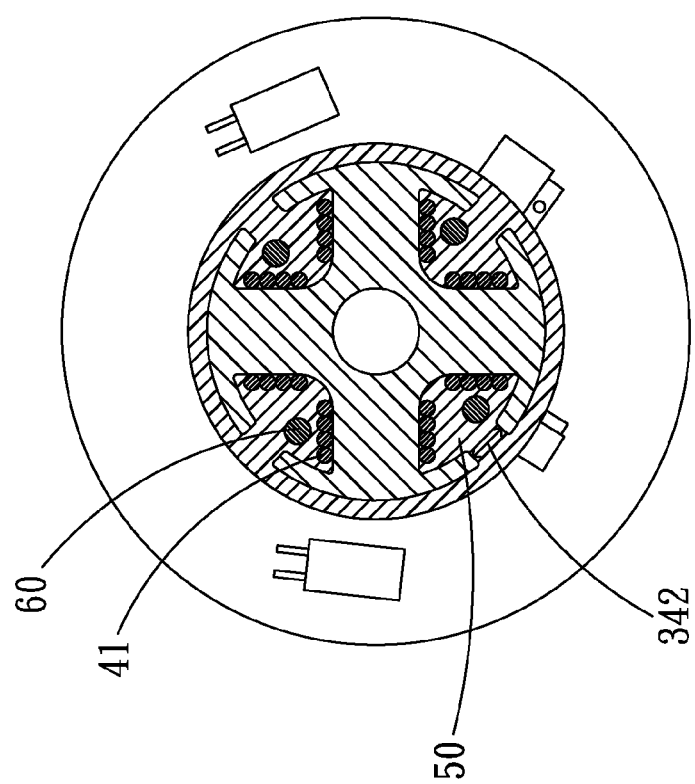
FIG. 4A is a partially sectioned top view of a motor stator with heat dissipation structure according to a third embodiment of the present invention.
Figure 4B:
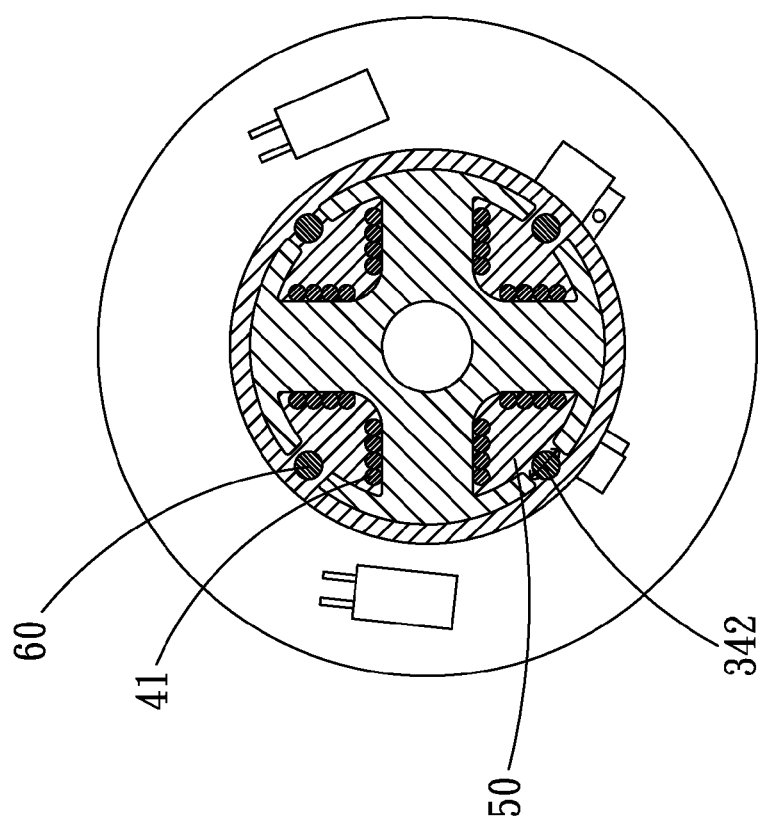
FIG. 4B is a partially sectioned top view of a variant of the motor stator with heat dissipation structure according to the third embodiment of the present invention.

FIG. 4A is a sectioned top view of a stator with heat dissipation structure according to a third embodiment of the present invention is shown. The stator of the present invention in the third embodiment is generally structurally similar to the first and the second embodiment, except that the heat pipes 60 are extended into or through the covering 50 at positions in the vicinity of one side of the windings 41. Alternatively, according to a variant of the third embodiment as shown in FIG. 4B, the heat pipes 60 may be extended into or through the covering 50 at positions in the openings 342. In either case, the heat transferred from the windings 41 and the silicon steel plate assembly 30 to the covering 50 can be further transferred to and absorbed by the heat pipes 60 and finally dissipated into ambient air to lower the temperature of the windings 41 and of the silicon steel plate assembly 30, so as to upgrade the cooling fan's heat dissipation characteristic.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A motor stator with heat dissipation structure, comprising:
   a silicon steel plate assembly including a plurality of stacked silicon steel plates; each of the silicon steel plates including a plurality of radially outward extended magnetic poles, and the magnetic poles of the stacked silicon steel plates together defining a plurality of magnetic-pole columns with a space formed between any two adjacent magnetic-pole columns; and each of the magnetic-pole columns having at least one winding wound thereon;
   a covering being a heat-conducting plastic material and filled into the spaces between the adjacent magnetic-pole columns and covered over the silicon steel plate assembly and the windings;
   a plurality of heat pipes being arranged in the spaces and extended into the covering filled in the spaces
   a fan circuit board connected to one of two axially opposite sides of the silicon steel plate assembly; and
   wherein the heat pipes respectively have an end extended through the covering to connect to the fan circuit board and a heat-dissipating end extending outside the covering to dissipate heat into ambient air.

2. The motor stator with heat dissipation structure as claimed in claim 1, wherein the covering is a heat-conducting plastic material.

3. The motor stator with heat dissipation structure as claimed in claim 2, wherein heat produced by the windings and the silicon steel plate assembly during operation thereof is transferred to the covering, and the heat transferred to the covering is further transferred to and absorbed by the heat pipes.

4. The motor stator with heat dissipation structure as claimed in claim 1, wherein the covering is covered over the silicon steel plate assembly, the windings and the heat pipes by way of integral injection molding.

5. The motor stator with heat dissipation structure as claimed in claim 1, further comprising a fan circuit board connected to one of two axially opposite sides of the silicon steel plate assembly.

6. The motor stator with heat dissipation structure as claimed in claim 5, wherein the heat pipes respectively have an end extended through the covering to connect to the fan circuit board.

7. The motor stator with heat dissipation structure as claimed in claim 1, wherein each of the magnetic poles on the silicon steel plate has a radially outer end formed with a circumferentially length-extended section; all the length-extended sections on each of the magnetic-pole columns defining a magnetic-pole end portion of the magnetic-pole column; and a narrowed opening being defined between two magnetic-pole end portions of any two adjacent magnetic-pole columns to communicate with the space defined between the two adjacent magnetic-pole columns.

8. The motor stator with heat dissipation structure as claimed in claim 1, wherein the silicon steel plates respectively have a central hole, such that all the central holes of the stacked silicon steel plates form an axial channel.

9. The motor stator with heat dissipation structure as claimed in claim 1, further comprising an insulating section provided between the silicon steel plate assembly and the windings.

* * * * *